United States Patent [19]

Salzer

[11] Patent Number: 4,649,885

[45] Date of Patent: Mar. 17, 1987

[54] METHOD AND APPARATUS FOR THE OPERATION OF AN INTERNAL COMBUSTION ENGINE

[75] Inventor: Lorenz Salzer, Gauting, Fed. Rep. of Germany

[73] Assignee: Bayerische Motoren Werke Aktiengesellschaft, Fed. Rep. of Germany

[21] Appl. No.: 815,679

[22] Filed: Jan. 3, 1986

Related U.S. Application Data

[63] Continuation of Ser. No. 618,675, Jun. 8, 1984, abandoned.

[30] Foreign Application Priority Data

Jun. 9, 1983 [DE] Fed. Rep. of Germany ....... 3320895

[51] Int. Cl.⁴ .................... F02B 33/00; F02P 5/04
[52] U.S. Cl. .................... 123/492; 123/422; 123/478; 123/480
[58] Field of Search ............... 123/492, 422, 493, 440, 123/478, 480

[56] References Cited

U.S. PATENT DOCUMENTS

| | | | |
|---|---|---|---|
| 1,992,383 | 2/1935 | Mallory | 123/422 |
| 2,864,356 | 12/1958 | Udale | 123/422 |
| 3,646,921 | 3/1972 | Marsee | 123/422 |
| 3,726,261 | 4/1973 | Sauer | 123/492 |
| 4,107,920 | 8/1978 | Minami | 123/440 |
| 4,111,162 | 9/1978 | Norimatsu | 123/440 |
| 4,119,072 | 10/1978 | Asano | 123/440 |
| 4,169,440 | 10/1979 | Taplin | 123/492 |
| 4,184,458 | 1/1980 | Aoki | 123/492 |
| 4,388,906 | 6/1983 | Sugiyama | 123/492 |
| 4,425,890 | 1/1984 | Yamaguchi | 123/422 |
| 4,434,768 | 3/1984 | Ninomiya | 123/492 |
| 4,454,847 | 6/1984 | Isomura | 123/492 |

FOREIGN PATENT DOCUMENTS 2903799 8/1980 Fed. Rep. of Germany ...... 123/492

*Primary Examiner*—Ronald B. Cox
*Attorney, Agent, or Firm*—Barnes & Thornburg

[57] ABSTRACT

A method and apparatus for operating an internal combustion engine which includes a rate of air-flow measuring device for the supplied combustion air, a fuel-metering arrangement controlled thereby and an ignition point-adjusting mechanism; the operating point during non-steady operation is displaced thereby from a position which is at least approximately optimum as regards fuel consumption, by an additional fuel quantity into a range less favorable from a consumption point of view. With renewed steady operation, the operating point is again readjusted corresponding to its starting position.

20 Claims, 5 Drawing Figures

METHOD AND APPARATUS FOR THE OPERATION OF AN INTERNAL COMBUSTION ENGINE

This is a continuation of application Ser. No. 618,675, filed June 8, 1984, now abandoned.

The present invention relates to a method and apparatus for operating an internal combustion engine which includes a rate of air-flow measuring device for the supplied combustion air, a fuel-metering device controlled thereby and an ignition instant-adjusting mechanism.

The present invention is concerned with a problem which results with such internal combustion engines from the construction, respectively, from the manner of operation of the rate of air-flow measuring device. A frequently used rate of air-flow measuring device which operates in the manner of a baffle plate, carries out during each change of the rate of air flow an oscillation about its respectively new end position. The cause therefor is the mechanical construction in which a springy force holds the baffle plate in equilibrium with the force exerted by the inflowing air. The output signal of the rate of air-flow measuring device thus carries out during each change of the rate of air flow a correspondingly damped oscillation with the consequence that also the fuel-metering device supplies a correspondingly varying fuel quantity. This problem also occurs with rate of air-flow measuring devices which are constructed according to other principles. This may involve, for example, an electrical air mass sensor which is based on a regulation of an electrical magnitude such as voltage or current intensity. The cause for this problem is always the inertia of such types of rate of air-flow measuring devices which is contrary to the requirement for a delay-free and exact reaction to changes of the rate of air flow.

The consequences of this problem lead to a widening of the tolerance band for the selection of the operating point of the internal combustion engine. The tolerance band is thus determined in the steady operating case by the customary series tolerances and in the non-steady operating case additionally by the effects of the described problem. The term "operating point" is to be understood thereby as the selection of the parameters "mixture composition" ($\lambda$) and "ignition angle" ($a_z$). For each combination of torque and rotational speed, the relatively lean mixture adjustment of the internal combustion engine which is desirable with a view toward optimization, i.e., minimization of the specific fuel consumption—characteristic values of $\lambda$ are therefore larger than 1—is determined by two further influencing magnitudes. One of these influencing magnitudes is the knocking limit which lies with a large value of $\lambda$ in the direction of a smaller value of $\lambda$, i.e., richer mixture, and the other is the operating limit which lies in the direction of a larger value of $\lambda$, i.e., leaner mixture.

It is the object of the present invention to provide a method and apparatus of the aforementioned type, in which the operation is constituted optimally from a consumption point of view under all operating conditions free of driving errors. The term "driving error" is thereby to be understood as those operating conditions in which the knocking, respectively, operating limit of the internal combustion engine is exceeded.

The underlying problems are solved by the present invention in that with non-steady operation, the operating point is displaced from an at least approximately consumption-optimum position into a range less favorable from a consumption point of view by an additional fuel quantity and in that with renewed steady operation, the operating point is readjusted corresponding to the initial position.

The present invention is based on the fact that one differentiates between the steady operating condition and the non-steady operating condition of the internal combustion engine. Since in the steady operating case, the width of the tolerance band for the fuel-air ratio which stems only from the series tolerances of the rate of air-quantity measuring device and of the fuel-metering device, has a relatively small value in relation to the non-steady operating case, the operating point can be selected at or in proximity to the position corresponding to the optimum fuel consumption. This operating point is thereby so adjusted that the tolerance band just fails to exceed the knocking and operating limit. In the non-steady operating case, in contrast thereto, the tolerance band is widened by reason of the problem described hereinabove so that with a fixed operating point, these limits would be exceeded. In the non-steady operating case, the operating point is thus so selected that the tolerance band which is then enlarged, borders at one or both of the two limits. At the end of the non-steady operating case, an operating point is again selected which lies at, respectively, near the consumption optimum position.

Dependent on the configuration of the two limits and depending on the mixture adjustment and the ignition point, an adjustment of the ignition point in the direction "retarded" may be connected with the change of the operating point between the steady and the non-steady operating case and vice-versa. This possibility is more favorable compared to the alternative knocking control both from the point of view of expenditure—a knocking regulation can then be dispensed with—as also from the point of view of engine load since the knocking of the internal combustion engine necessary for the response of the knocking regulation is thereby completely avoided.

This retraction or taking-back of the ignition point is particularly effective if it is undertaken evenly and synchronously with the change of the fuel-air ratio. In contrast to a stepwise retraction of the ignition angle or with a retraction of the ignition angle non-matched to the curve of the change of this ratio, the operating point can be kept thereby during the entire non-steady operating case on or in proximity of the curve of the respective ignition-angle optimum value. This optimum value is determined by the respective fuel consumption optimum.

The widening of the tolerance band is, as is quite apparent immediately for a mechanical rate of air-flow measuring device capable of oscillations, the greater the larger the rate of change of the rate of air flow, respectively, of the initial pulse of the disturbance. It is largest with a maximum acceleration desire. This case is customarily taken into consideration by a so-called acceleration enrichment in the form of a sudden admixture of an additional fuel quantity. The consequence of this high rate of change of the rate of air flow is, in addition to a considerable impairment of the driving comfort, a strong overshooting of the rate of air-flow measuring signal determinative for the fuel-metering device, which is conditioned by the oscillatory behavior of the rate of air-flow measuring device. If, as is generally customary, no differentiation is made between the steady and the non-steady operating case, then ultimately this extreme case determines the selection of the operating point and leads to the fact that the same is located relatively far from the location of optimum fuel consumption.

In conjunction with the differentiation according to the present invention between the steady and the non-steady operating case, the effect of such an extreme change of the rate of air-flow measuring signal which does not do justice to the actuation conditions, can be avoided in different ways with simultaneous considerable improvement of the driving comfort. The configuration of the acceleration enrichment with a trapezoidally or bell-shaped curve belong thereto. As a result thereof, the acceleration enrichment can be matched to the curve and, in particular, to the decay behavior of the signal.

A further possibility resides in adjusting the acceleration enrichment linearly proportionally to the respective acceleration desire, possibly under limitation to a maximum value. Finally, the acceleration enrichment may also be selected linearly proportional to the fuel-air ratio. Since the consumption-optimum operating point of the internal combustion engine lies at high values of $\lambda$, i.e., extremely lean mixture, the acceleration enrichment at lean mixture becomes relatively large and with a richer mixture relatively small. As a result thereof, the acceleration enrichment is matched to the requirement and thus an optimum operating behavior of the internal combustion engine is achieved.

These and other objects, features and advantages of the present invention will become more apparent from the following description when taken in connection with the accompanying drawing which shows, for purposes of illustration only, one embodiment in accordance with the present invention, and wherein.

Figure 1:
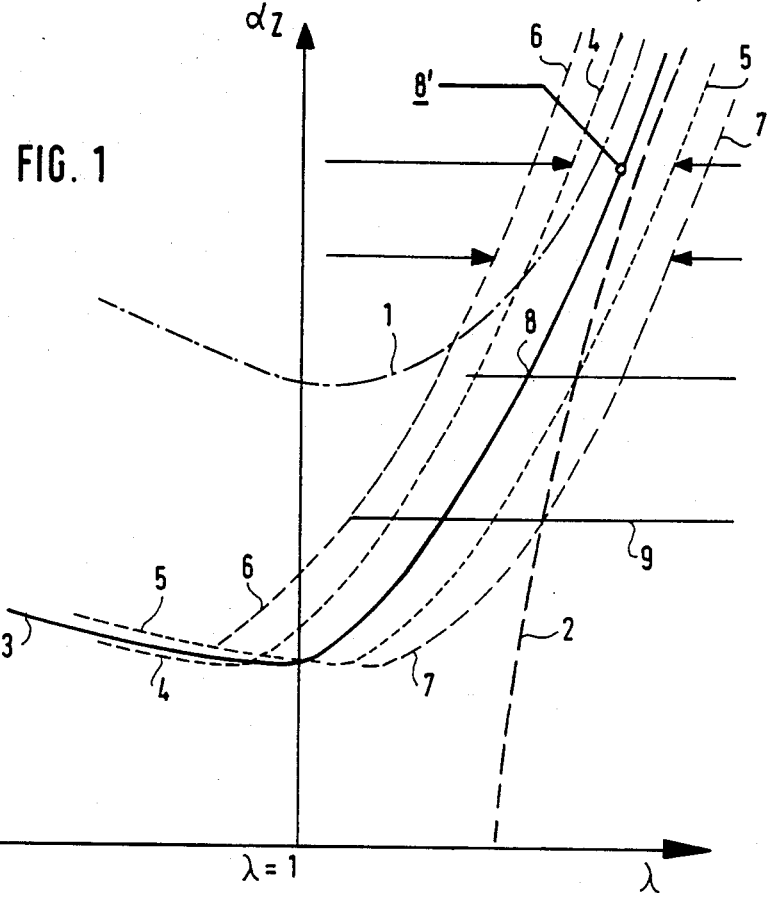
FIG. 1 is a diagram illustrating the possible selection of the operating points for values of torque and rotational speed predetermined at will by reference to the parameters $\lambda$ for the fuel-air ratio and $a_Z$ for the ignition angle.

Referring now to FIG. 1 of the drawing, the diagram of this figure illustrates the possible selection of the operating points for values of torque and rotational speed determined at will by reference to the parameters $\lambda$ for the fuel-air ratio and $a_Z$ for the ignition angle. The useful range is limited by the knocking boundary 1 and the operating boundary 2. A curve 3 designated by "ignition best value" reproduces the ignition angles at which a fuel consumption minimum exists for the respective value of the fuel-air ratio. The curve 3 contains a point 8' at which the specific consumption has its absolute minimum.

A tolerance band results for each point of the curve 3, taking into consideration the series tolerances, which essentially extends only in, respectively, opposite the direction of the parameter $\lambda$, whereas possibly occurring tolerance-conditioned changes of the ignition angle $a_Z$ are without significance. The tolerance band in the $\lambda$-direction is dependent on the type of operation of the internal combustion engine. With a steady operation, it is relatively small and is illustrated, as to its tendency, by the curves 4 and 5 parallel to the curve 3. This cause therefor is the differently metered fuel quantity by reason of the tolerances of the corresponding installation and the tolerance of the structural parts of the rate of air-flow measuring device which may involve, for example, a baffle plate or a heating wire.

During the non-steady operating case, the tolerance band is enlarged about the curve 3 by the considerable influence of the oscillatory behavior of the rate of air-flow measuring device. This influence is schematically indicated by curves 6 and 7 parallel to the curve 3. The curve 7 represents the extreme case with largest possible acceleration desire of the driver.

According to the present invention, the operating point of the internal combustion engine is to be selected as near as possible to the point 8'. It follows from the diagram that in the steady operating case, the operating point can be selected approximately at a place or location 8. This point is obtained as regards its value $a_Z$ from the point of intersection of the curve 5 and the operating limit 2. This operating point 8 differs from the ideal operating point 8' only slightly in its specific fuel consumption.

In the non-steady operating case, the operating point cannot be maintained at the location 8 since in that case the curves 6 and 7, respectively, curves lying between these curves and the curves 4 and 5 in case of a smaller acceleration desire of the driver compared to the extreme case are then determinative. This leads to the fact that the operating point in the non-steady case must be selected, for example, on or in proximity of a line 9, whose height is determined by the point of intersection of the curve 7 and the operating limit 2.

During transition between the steady and the non-steady operating case, a change of the ignition angle in the direction "retarded" can be undertaken in the same sense synchronously with the change of the fuel-air mixture. Upon termination of the non-steady operation, a point corresponding to the starting point 8 is then anew approached on the then-determinative diagram for the ignition angles as a function of the fuel-air mixture with the then-existing values for rotational speed and torque. For that purpose, the ignition point or instant is again adjusted in the direction of "advanced" and the mixture is adjusted in the direction lean, i.e., larger $\lambda$.

Whereas the adjustment of the ignition point can be undertaken relatively free of problems, for example, with the aid of a change of the ignition angle in the same sense and synchronously with the mixture composition, the change of the fuel-air ratio is matched to the underlying problem in a particular manner. The boundary curves 6 and 7 for the non-steady operating case are the more remote from the ignition "best value" curve 3, the greater the rate of change of the mixture composition. The rate is approximately proportional to the change of the rate of air flow measurement signal. One should therefore aim at equalizing the changes of the fuel-air mixture occurring during the non-steady operating case since in that case the deviation of the maximally remote operating point corresponding to the point 9 from the starting point 8 which occurs during non-steady operating case, can then be limited to the smallest possible amount.

This is achieved by a particular selection of the acceleration enrichment which is illustrated by reference to the diagrams in FIGS. 2a-2c.

Figure 2A:
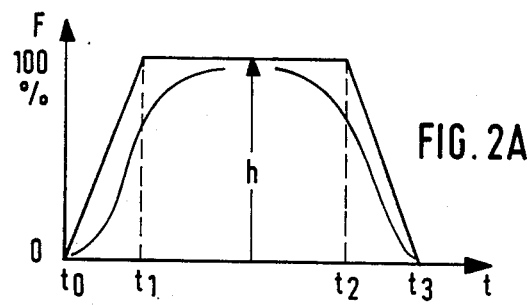
FIG. 2a is a diagram for the factor F determinative for the acceleration enrichment as a function of time.
Figure 2B:
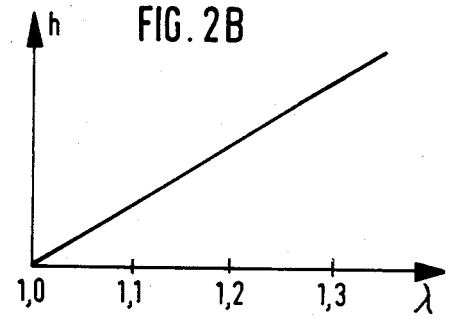
FIG. 2b is a diagram indicating the height h of the trapeze as a function of $\lambda$.

The diagram in FIG. 2a illustrates the curve of the factor F determinative for the acceleration enrichment as a function of time. This factor moves along a trapezoidal curve which is characterized by a rise at one end and a drop at the other end as well as a variable maximum. The operating point can thus be kept relatively near the initial operating point 8. The variable height h of the trapeze is dependent on the magnitude of the value λ at the beginning of the non-steady operation and is directly proportional to this value. This dependency is shown in the diagram of FIG. 2b and rests on the fact that an enrichment is necessary which is the greater, the greater the fuel-air ratio in the preceding steady operation.

Figure 2C:
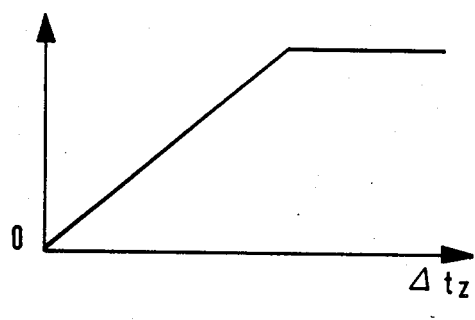
FIG. 2c is a diagram indicating the maximum factor F as a function of $\Delta\ t_L$ corresponding to the acceleration desire.

Finally, the diagram in FIG. 2c illustrates the maximum factor F as a function of the acceleration desire. The condition is thereby taken into consideration that a slight acceleration requires a small acceleration enrichment whereas strong accelerations require a large acceleration enrichment and the magnitude of the initial disturbance pulse corresponds to the acceleration enrichment. The factor F is thereby plotted as a function of the change Δ of a load signal $t_z$. The load signal $t_z$, in its turn, depends directly fraom the rate of air-flow measurement signal.

Figure 3:
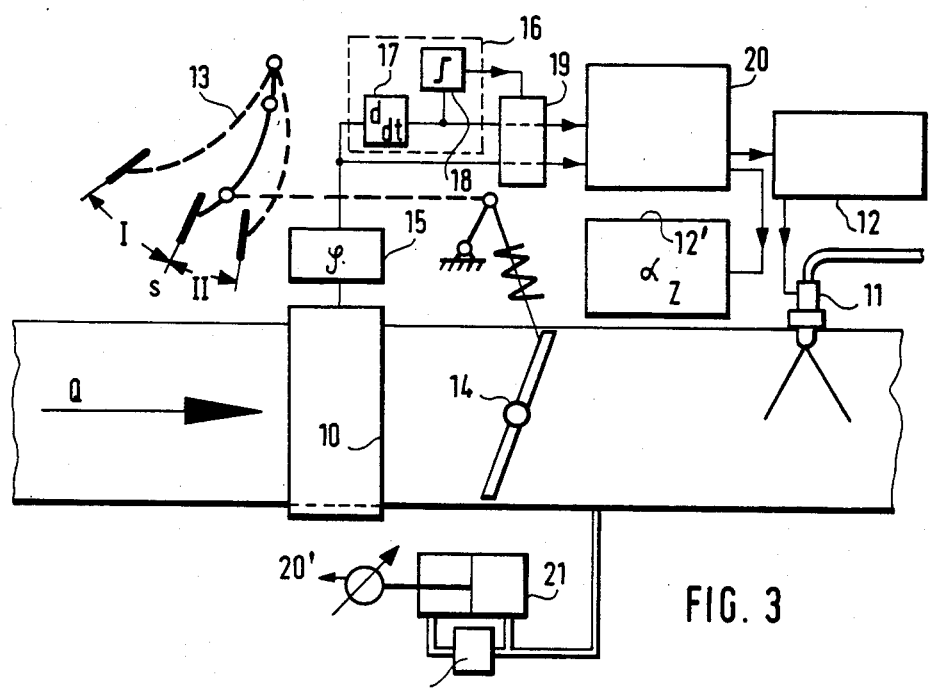
FIG. 3 is a schematic block diagram of an apparatus in accordance with the present invention for carrying out the method in accordance with the present invention.

FIG. 3 illustrates a circuit arrangement, by means of which the method in accordance with the present invention can be realized. An internal combustion engine, not illustrated in detail, includes a rate of air-flow measuring device in the manner of a baffle plate 10 for the supplied combustion air, a fuel-metering device controlled thereby in the form of injection nozzles 11 with associated control apparatus 12 as well as an ignition point adjusting device 12'. The supplied combustion air is controlled by a throttle valve 14 which is connected directly or indirectly with an acceleration pedal 13 of the motor vehicle. An angle pick-up 15 is arranged at the baffle plate 10 whose output signal reproduces the angular position of this baffle plate.

The output signal of the angle pick-up 15 is conducted by way of a recognition or identification stage 16 which includes essentially a differentiating stage 17 with threshold circuit 18 connected in the output thereof. If the output signal of the differentiating stage 17 exceeds the value determined by the threshold circuit 18, i.e., if the change of the baffle plate angle is larger than a predetermined amount, then a gate circuit 19 is opened by the threshold circuit 18 and the output signal of the differentiating stage 17 together with the signal of the angle pick-up 15 is transmitted to a processing unit 20, to which the control apparatus 12 and the adjusting installation 12' are connected.

Characteristic fields, respectively, characteristic curves are stored in the processing unit 20 which correspond to the curves illustrated in FIGS. 1 and 2a to 2c. Characteristic fields corresponding to FIG. 1 for all possible value pairs of torque and rotational speed exist thereby in the storage device of the processing unit 20.

Corresponding to the stored characteristic fields, the necessary corrections of the ignition point and of the fuel-air ratio are undertaken for each value pair of torque and rotational speed for the steady operating case and for the non-steady operating case determined corresponding to the output signal of the differentiating stage 17.

In lieu of the angle pick-up 15 with differentiating stage 17 connected in the output thereof, for example, also a differentiating box 21 (variometer) with electrical evaluation and acted upon by the suction pipe pressure can be used.

It becomes possible thereby to select during the steady operating case an operating point in proximity or at the location of the optimum operating point 8' (FIG. 1), as permitted by the series tolerances, and to move in the non-steady operating case away from this operating point only so far as is necessary by the oscillating influence of the rate of air-flow measuring device. An adjustment of the fuel-air mixture and of the ignition point results therefrom which is optimum from a consumption point of view over the entire operation of the internal combustion engine.

Since the particular circuits, logic elements and units shown in the block diagram of FIG. 3, which are used in the present invention, are known as such to a person skilled in the art, a detailed description thereof is dispensed with herein for the sake of clarity.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method for the operation of an internal combustion engine which includes an air-flow rate measuring device for the combustion air supplied to the engine, a fuel-metering device controlled thereby and operating within certain variable tolerance ranges of air-fuel ratio variation and an ignition timing point adjusting mechanism, comprising the steps of displacing the operating point of the fuel metering device by adding additional fuel during a period of non-steady state operation from a first greater than stoichiometric point on a best ignition curve at least approximately corresponding to an optimum fuel consumption optimum condition at which point the fuel metering device operates with a relatively narrow range of air-fuel ratio variation to a second greater than stoichiometric operating point on said curve which corresponds to less favorable fuel consumption and at which second point the fuel control device operates with wider ranges of air-fuel variation and during renewed steady operation, returning the operation of the fuel metering device to said first operating point.

2. A method according to claim 1, wherein the ignition point is displaced in the direction toward retarded ignition during the non-steady operation.

3. A method according to claim 2, wherein the ignition point is displaced proportionally and synchronously with the change of the fuel-air ratio.

4. A method according to claim 3, wherein the additional fuel quantity is supplied with respect to time corresponding to a predetermined curve.

5. A method according to claim 4, wherein the curve is essentially trapezoidally shaped.

6. A method according to claim 4, wherein the curve is essentially bell-shaped.

7. A method according to claim 4, wherein the maximum additional fuel quantity per time is selected proportional to the fuel-air ratio of the initial position.

8. A method according to claim 7, wherein the curve is essentially trapezoidally shaped.

9. A method according to claim 7, wherein the curve is essentially bell-shaped.

10. A method according to claim 1, wherein the additional fuel quantity is supplied with respect to time corresponding to a predetermined curve.

11. A method according to claim 10, wherein the maximum additional fuel quantity per time is selected proportional to the fuel-air ratio of the initial position.

12. An apparatus for operating an internal combustion engine, comprising an air-flow rate measuring means for the combustion air supplied to the engine, fuel-metering means controlled thereby and operating within certain variable tolerance ranges of air-fuel variation, ignition timing point adjusting means for adjusting the ignition point of the engine, and control means for displacing the operating point of the fuel metering means by adding additional fuel during a period of non-steady operation from a first greater than stoichiometric point on a best ignition curve at least approximately corresponding to an optimum fuel consumption condition at which point the fuel metering means operates with a relatively narrow range of air-fuel variation to a second greater than stoichiometric operating point on said curve which corresponds to less favorable fuel consumption and at which second point the fuel control means operates with a wider range of air-fuel variation and during renewed steady operation returning the operation of the fuel metering means to said first operating point.

13. An apparatus according to claim 12, wherein said control means is operable to displace the ignition point of the engine during non-steady operation in the direction of retarded ignition.

14. An apparatus according to claim 13, wherein said control means is operable to displace the ignition point in the same sense synchronously with a change of the fuel-air ratio.

15. An apparatus according to claim 13, wherein said control means is operable to supply the additional fuel quantity as a function to time corresponding to a trapezoidally or bell-shaped curve.

16. An apparatus according to claim 15, wherein the maximum additional fuel quantity per time is substantially proportional to the fuel-air ratio of the initial location.

17. An apparatus according to claim 16, wherein said control means includes pick-up means for producing an output signal corresponding to the existing rate of air flow, recognition means having an input to which is applied the output signal of the pick-up means, said recognition means including differentiating means and threshold circuit means connected in the output of the differentiating means, said recognition means being operable to open a gate means if the output signal of the differentiating means exceeds the value determined by the threshold circuit means, and a processing unit to which is applied the output signal of the differentiating means together with the output signal of the pick-up means.

18. An apparatus according to claim 12, wherein said control means is operable to supply the additional fuel quantity as a function to time corresponding to a trapezoidally or bell-shaped curve.

19. An apparatus according to claim 18, wherein the maximum additional fuel quantity per time is substantially proportional to the fuel-air ratio of the initial range.

20. An apparatus according to claim 12, wherein said control means includes pick-up means for producing an output signal corresponding to the existing rate of air flow, recognition means having an input to which is applied the output signal of the pick-up means, said recognition means including differentiating means and threshold circuit means connected in the output of the differentiating means, said recognition means being operable to open a gate means if the output signal of the differentiating means exceeds the value determined by the threshold circuit means, and a processing unit to which is applied the output signal of the differentiating means together with the output signal of the pick-up means.

* * * * *